(12) United States Patent
Suzuki

(10) Patent No.: US 7,819,731 B2
(45) Date of Patent: Oct. 26, 2010

(54) METHOD FOR GENERATING GAME ELEMENT FROM PHOTOGRAPHED IMAGE

(75) Inventor: Aya Suzuki, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1246 days.

(21) Appl. No.: 11/206,868

(22) Filed: Aug. 19, 2005

(65) Prior Publication Data

US 2006/0046803 A1 Mar. 2, 2006

(30) Foreign Application Priority Data

Aug. 26, 2004 (JP) ............................ P2004-247448

(51) Int. Cl.
*A63F 13/00* (2006.01)
(52) U.S. Cl. .................. 463/1; 463/9; 463/30; 463/31; 463/34
(58) Field of Classification Search .................. 463/1, 463/6, 31, 32, 33, 40–42, 47
See application file for complete search history.

(56) References Cited

U.S. PATENT DOCUMENTS 6,677,967 B2 * 1/2004 Sawano et al. .............. 715/839

FOREIGN PATENT DOCUMENTS

| JP | 2002-159739 | 6/2002 |
| JP | 2002-360936 | 12/2002 |
| JP | 2004-070821 | 3/2004 |

OTHER PUBLICATIONS

Pokemon Snap game manual, released Jul. 27, 1999.*
"Pokemon Snap" game review written by Matt Casamassina on Jul. 27 1999. posted at http://ign64.ign.com/articles/152/152335p1.html, retrieved on Mar. 10, 2009.*
English Language Abstract of JP 2004-070821.
English Language Abstract of JP 2002-360936.
"Weekly Fami-Tsu, 2004, 8/20.27 Issue (Portable Games No. 173)," Enterbrain Inc., Aug. 6, 2004 Received by the Patent Office, vol. 19, No. 35 p. 106, together with a partial English language translation.
"V Jump," Shueisha Inc., Oct. 1, 2004, vol. 12, No. 10, p. 122, (Circulated on Aug. 21, 2004), together with a partial English language translation.
English Language Abstract of JP 2002-159739.

* cited by examiner

*Primary Examiner*—Ronald Laneau
*Assistant Examiner*—Ross A. Williams
(74) *Attorney, Agent, or Firm*—Greenblum & Bernstein P.L.C.

(57) ABSTRACT

When a player character has a raw stone material, a player can carry out material conversion at an arbitrary timing. In the material conversion, the player captures an arbitrary image in a real space or a virtual 3D space. RGB data of predetermined pixels are extracted from the captured image data, and average values for R, G, and B are acquired separately. A material of a type corresponding to the calculated average values of the RGB data is generated. When the player equips the player character with the material generated by the material conversion, magic corresponding to the equipped material can be used.

30 Claims, 9 Drawing Sheets

FIG.2A

| No. | MATERIAL NAME | ATTRIBUTE | AP | MATERIAL LEVEL | EQUIPMENT |
|---|---|---|---|---|---|
| 1 | material A3 | A | 1412 | 2 | ✓ |
| 2 | material D1 | D | 52 | 1 | |
| 3 | material G2 | G | 6119 | 4 | |
| 4 | material B2 | B | 3105 | 3 | |
| 5 | | | | | |

FIG.2B

| RANGE OF AVERAGE RGB | ATTRIBUTE |
|---|---|
| R>B>G | A |
| R>G>B | B |
| B>G>R | C |
| B>R>G | D |
| G>R>B | E |
| G>B>R | F |
| R=B=G=0 | G |
| R=B=G=255 | H |
| R=B or B=G or G=R | I |

FIG.2C

| ATTRIBUTE | RGB REMAINDER 0 | RGB REMAINDER 1 | RGB REMAINDER 2 |
|---|---|---|---|
| A | material A1 | material A2 | material A3 |
| B | material B1 | material B2 | material B3 |
| C | material C1 | material C2 | material C3 |
| D | material D1 | | material D2 |
| E | material E1 | | material E2 |
| F | material F1 | material F2 | |
| G | material G1 | material G2 | |
| H | material H1 | | |
| I | material I1 | | |

METHOD FOR GENERATING GAME ELEMENT FROM PHOTOGRAPHED IMAGE

CROSS REFERENCE TO RELATED APPLICATION

The present disclosure relates to subject matter contained in Japanese Patent Application No. 2004-247488, filed on Aug. 26, 2004, the disclosure of which is expressly incorporated herein by reference in its entirety.

BACKGROUND OF THE INVENTION

1. Field of the Invention

The present invention relates to video games. More specifically, the present invention relates to generating, from a photographed image, a game element for use in a game played on a terminal device, such as a cellular phone.

2. Description of the Related Art

In a role playing game, a player plays the role of a player character in a virtual space. The player character solves problems by using various items while moving in the virtual space. The variations of the ways of solving the problems during progress of the game can be increased by the use of items by the player character. For instance, the effective usage of the items by the player can quicken the progress of the game. Accordingly, the player is interested in the presence or absence of the items.

Recently, players' demands are changing from simply enjoying the same game as other players play to enjoying his or her own game. For instance, Unexamined Japanese Patent Publication No. 2002-159739 discloses a game machine which acquires environmental data from outside of the virtual space and reflects the data in the game.

In the technology of Unexamined Japanese Patent Publication No. 2002-159739, however, a player acquires at least one piece of environmental data from multiple types of environmental data, such as a direction, a weather, an atmospheric condition, a temperature, and the amount of light, from the outside of the virtual space. The player generates a character which appears in the game. The generated character varies in accordance with the acquired environmental data. In this case, the degree of the effect of the data acquired from the outside of the virtual space on the progress of the game becomes too large. Accordingly, acquisition of the environmental data may cause the game to progress against the player's intention.

SUMMARY OF THE INVENTION

Accordingly, it is an object of the present invention to increase variations to the contents of a game which allows a player character to use a game element as the game progresses.

To achieve the object, a game machine according to a first aspect of the invention executes a game which allows a player character, which moves in a virtual space, to use an element selected from game elements during progress of the game. The game machine has an imaging device for capturing an image according to a player's instruction. The game machine also has an image storage for storing image data of the captured image, and an image analyzer for analyzing the stored image data. The game machine further includes a game element generator for generating a game element whose type corresponds to a result of analysis of the image data. The new game element can be used by the player character. The game machine further includes a game element storage for storing the types of game elements including the generated game element. The game machine also has a game element selector for allowing the player to select the game element to be used by the player character from the types of game elements stored in the game element storage. The game machine has a game element using section for allowing the player character to use the selected game element during progress of the game.

The game machine generates a game element, which is used by a player character in the progress of the game, based on an image captured in response to an instruction from the player. Accordingly, the progress of the game is changed by the player's selection of the opportunity of generating a game element as well as the player's selection of the opportunity of using a game element. This scheme increases a change in the content of the game, thereby providing the game with variety.

While the timing when an image is captured to generate a game element is determined according to a player's instruction, generation of the game element does not cause the progress of the game to change by itself. The generated game element can be used by a player character according to a further player's instruction. This prevents the game from progressing against the player's intention as a result of the player's generating the game element.

The imaging device may capture an image of a real space with a camera equipped in the game machine in response to the player's instruction. Alternatively, the imaging device may capture an image of the virtual space with a virtual camera located at or near the player character in the virtual space in response to the player's instruction.

To achieve the object, a game machine according to a second aspect of the invention executes a game which allows a player character, which moves in a virtual space, to use a game element selected from game elements during progress of the game. The game machine has a program memory which stores a program, a data memory which stores data, and a processor which executes the program.

The processor executes the program to capture an image according to a player's instruction. The processor further executes the program to store image data of the captured image in the data memory and to analyze the stored image data. The processor further still executes the program to generate a game element whose type corresponds to a result of analysis of the image data as the new game element that can be used by the player character. The processor further executes the program to store the generated game element in the data memory. The processor further executes the program to allow the player to select the game element to be used by the player character from the game elements stored in the data memory. The processor further executes the program to allow the player character to use the selected game element during progress of the game.

The program which is stored in the program memory in the game machine according to the second aspect of the invention can be provided in the form of a computer readable recording medium where the program is recorded. The computer readable recording medium may be designed to be attached to and detached from a computer device, so that the recording medium is provided as separate from the computer device. The computer readable recording medium may be designed like a fixed disk unit, which comes equipped in a computer device. The program which is stored in the program memory in the game machine according to the second aspect of the invention can be distributed via a network in the form of data signals superimposed on a carrier wave from a server device present on the network.

To achieve the objects of the present invention, a game progressing method according to a third aspect of the invention allows a computer device to execute a game that allows a player character, which moves in a virtual space, to use a game element selected from game elements during progress of the game. The method captures an image according to a player's instruction. The method further stores image data of the captured image in a memory of the computer and analyzes the stored image data. The method further generates a game element of a type corresponding to a result of analysis of the image data. The new game element can be used by the player character. The method further stores the generated game element in the memory. The method further allows the player to select the game element to be used by the player character from the game elements stored in the memory. The method still further allows the player character to use the selected game element during progress of the game.

BRIEF DESCRIPTION OF THE DRAWINGS

FIG. 2A is a diagram illustrating a material possession table stored in a RAM of the cellular phone.

FIG. 2B is a diagram illustrating a material-attribute decision table stored in a ROM of the cellular phone.

FIG. 2C is a diagram illustrating a material-name decision table stored in the ROM of the cellular phone.

DETAILED DESCRIPTION OF THE PREFERRED EMBODIMENTS

An embodiment of the present invention will now be explained with reference to the accompanying drawings.

Figure 1:
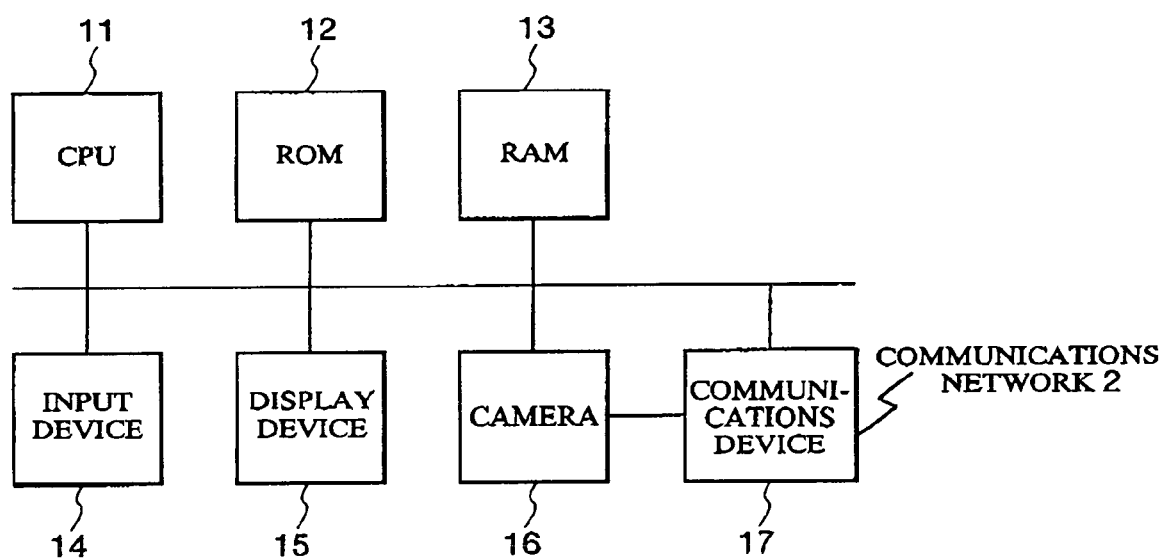
FIG. 1 is a block diagram illustrating the structure of a cellular phone according to an embodiment of the present invention.

FIG. 1 is a block diagram illustrating a structure of a cellular phone adapted as a game machine in an embodiment. As illustrated, the cellular phone comprises a CPU (Central Processing Unit) 11, a ROM (Read Only Memory) 12, a RAM (Random Access Memory) 13, an input device 14, a display device 15, a camera 16, and a communications device 17. The cellular phone has components necessary for communications, which are not illustrated in FIG. 1 for they do not directly relate to the invention.

The CPU 11 executes a program stored in the ROM 12, and carries out processes necessary for the progress of a game. The ROM 12 stores programs including the application program of the game, which the CPU 11 processes. At least a part of the ROM 12 is constituted by an electrically programmable and erasable flash memory. The application program of the game (including fixed data used by the application) is downloaded from a server device via a communications network 2, and stored in the flash memory. The RAM 13 is battery-backed up. The RAM 13 stores various tables and data of photographed images both to be discussed later. The RAM 13 is used as the work area for the CPU 11.

The input device 14 has numeric keys of "1" to "9", and "0", a "*" key, a "#" key, and direction keys of up, down, right, and left. The input device 14 inputs necessary information (instructions) into the CPU 11 in accordance with the manipulation of the player. In progressing the game, the direction keys are used for instructing the movement of a player character, and for selecting a command (for instance, the action of the player character). At the time of activating the camera, the direction keys are used for adjusting the zoom of the camera. The direction keys are also used to move the direction of the virtual camera at the time of shooting an image in a virtual space to be discussed later.

The display device 15 comprises a liquid crystal display device. The display device 15 displays screens of the game in play. The display device 15 also displays the image of the real space as captured image information. The camera 16 comprises an imaging device, and photographs an image of the real space in response to the instruction from the player. The cellular phone 1 may not have the camera 16. In a case where the cellular phone 1 does not have the camera 16, the image of a virtual three-dimensional (3D) space is photographed. The photographing in the virtual 3D space will be explained in detail later. The communications device 17 sends and receives information to and from other cellular phones and a server device in the communications network 2.

Each cellular phone executes the application program for the game in response to instruction from the player as the user of the cellular phone. The game executed by the cellular phone progresses as the player character moves in the virtual 3D space in response to the instruction from the player. In the virtual 3D space in the game, the screen of the game to be displayed on the display device 15 is generated by generating an image perspectively transformed onto the virtual screen with the visual line directed toward the player character from the viewpoint which is set according to the position of the player character. This scheme can be the same as the one used in the conventional game machine.

The player character can acquire raw stone material at predetermined points on a map of the virtual 3D space. The player character can generate a material from the acquired raw stone material in response to instruction from the player. The player character can have or possess up to a predetermined number (e.g., five) of materials. Each material has one or more attributes, each attribute having different roles in the progress of the game. The attribute of the material is decided when the material is generated. The player character can be equipped with only one material selected by the player from the possessing materials.

The battle between the player character and an enemy character starts as the player character moves to a predetermined point on the map in the virtual 3D space. In the battle, the player character can attack the enemy character with magic corresponding to the attribute of the equipped material. The player character can defend against the enemy character's attack with the equipped material. Regardless of whether the battle is taking place or not, the player can generate a new material from any raw stone material the player has, and can equip the player character with the newly generated material.

A description will be given of data necessary for the player to generate a material from a raw stone material (hereinafter referred to as "material conversion"), and to equip the player character with the material in the game according to an embodiment. Though the CPU 11 needs various data in the game progress, only data necessary for the material conversion and the equipment of the material will be discussed below.

With a material equipped, the player character can use magic corresponding to the attribute of the equipped material. The material with which the player character is equipped is decided by the player's selection of one material from the materials possessed by the player character and stored in the RAM 13.

FIG. 2A illustrates an example of a material possession table of the player character stored in the RAM 13. The material possession table stores material names, material attributes, ability points (hereinafter, "AP"), material levels, and equipment conditions in association with one another.

In an embodiment, there are 13 types of material names, A1 to A3, B1 to B3, C1 to C3, D1, D2, E1, E2, F1, F2, G1, G2, H1 and I1. Each of nine types of attributes, A to 1, represents the classification of a magic type. The AP represents the experience points of a material. The material level represents the effect of the magic (intensities of offensive and defensive forces), and can have five grades of 1 to 5. Materials with the same attribute but with different names have different effects on the magic (in comparison to materials with the same material level).

The value of the material level goes up in accordance with the AP of the material reaching a predetermined point. Once the value of the material level goes up, it never goes down. The AP is exclusive experience points for the material. When the player character defeats an enemy character in the battle, the value of the AP corresponding to the material with which the player character is equipped rises. In an embodiment, the player character can possess up to five materials. The player character can be equipped with only one material selected from the possessing materials in response to the instruction from the player. The player character carries out material conversion in response to the instruction from the player, thereby acquiring a material.

The material conversion is the process in which the CPU 11 analyzes image data of an image captured in response to the instruction from the player and generates a material of a type corresponding to the analytical result. The image data to be analyzed may be image data of an image of the real space photographed by the player with the camera 16 of the cellular phone. The image data to be analyzed may be image data of an image which is originated from perspective transformation of the virtual 3D space onto a virtual screen for image shooting from the viewpoint located at the place of the virtual camera owned by the player character, with the visual line of sight being directed toward the lens of that virtual camera. The material conversion is carried out on the condition that the player character should have at least one raw stone material. The player character moves to a predetermined point on the map of the virtual 3D space to acquire a raw stone material.

An explanation will now be given of how to decide the material status (attribute, material name), which is carried out in the material conversion. The material status (attribute, material name) is decided from calculated average values of R, G, and B in RGB data of specific pixel points defined in the image data of the shot image (hereinafter referred to as "average RGB"). The attribute of a material is decided by referring to a material-attribute decision table in accordance with the calculated average RGB. The material name is decided by referring to the material-name decision table in accordance with the remainder of the sum of the individual values of the calculated average RGB divided by three (hereinafter called "RGB remainder"), and the attribute already decided. The material that is generated by the material conversion has at least one of the attributes, each having a different role in the progress of the game, in accordance with the result of analysis on the captured image data. Materials with the same attribute have different effects on a magic type if their material names decided by the RGB remainders differ from one another.

FIG. 2B is a diagram illustrating the material-attribute decision table which is referred to for deciding the attribute of a material at the material conversion. The material-attribute decision table is prestored in the ROM 12 through the download of the application program of the game. As illustrated in FIG. 2B, the material-attribute decision table stores the range of the values of the average RGB, decided by the image analysis, and the material attribute in association with each other.

FIG. 2C is a diagram illustrating the material-name decision table which is referred to for deciding a material name at the time of material conversion. Like the material-attribute decision table, the material-name decision table is prestored in the ROM 12 through the download of the application program of the game. As illustrated in FIG. 2C, the material-name decision table stores the attributes of materials, RGB remainders, and material names in association with one another. While the materials A1 to A3 have the same attribute, the material name changes in accordance with the value of the RGB remainder. With regard to the material H1, the material name is set by the attribute regardless of the value of the RGB remainder.

The progress of the game on a cellular phone will now be explained. When the player instructs the start of the game on the cellular phone, an initial screen for the selection of the start of the game from the beginning or the resumption of the game from the interrupted point is displayed on the display device 15. The player operates the input device 14 in accordance with the initial screen, and selects either the start of the game from the beginning or the resumption of the game from the interrupted point. When the player selects the mode to start from the beginning, the CPU 11 loads initial data from the ROM 12, and starts the process of the game. When the player selects the mode to resume from the interrupted point, the CPU 11 loads saved data (explained later) from the RAM 13, and starts the process of the game.

Figure 3:
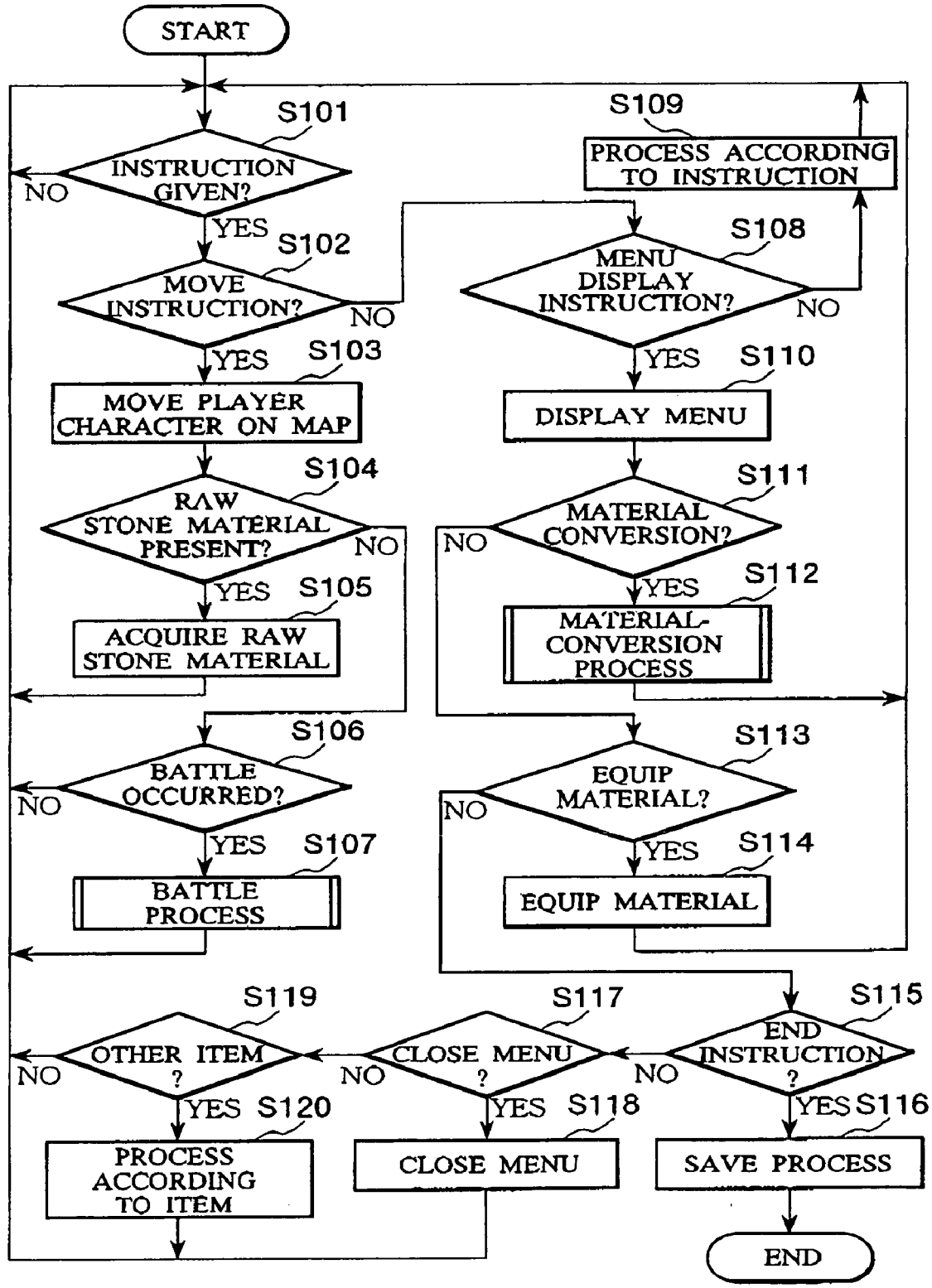
FIG. 3 is a flowchart illustrating an exemplary process of a main routine in a game according to the embodiment of the present invention.

FIG. 3 is a flowchart illustrating the process of a main routine in the game according to an embodiment. When the process for the main routine starts, the CPU 11 determines whether or not an instruction from the player is input from the input device 14 (step S101). The CPU 11 repeats the process at step S101, thereby waiting for the input of any instruction from the player until the instruction from the player is input from the input device 14.

When the instruction from the player is input, the CPU 11 determines whether or not the input instruction is a move instruction for the player character (step S102). If the input instruction is the move instruction, the CPU 11 moves the player character on the map, formed at the virtual 3D space displayed on the display device 15, according to the move instruction (step S103).

The CPU 11 determines whether or not the player character has reached a point for acquiring a raw stone material on the map, as a consequence of moving the player character (step S104). When the player character has reached the raw stone material acquisition point, the CPU 11 allows the player character to acquire the raw stone material, and increases the number of acquired raw stone materials, stored in the RAM 13, by one (step S105). The CPU 11 then returns to the process at step S101.

If the player character has not reached the raw stone material acquisition point, the CPU 11 determines whether or not the player character has reached a battle point on the map where a battle takes place (step S106). If the player character has reached the battle point, the CPU 11 executes a battle process which allows the player character to battle against an enemy character (step S107). The details of the battle process will be, given later. When the battle process ends, and the CPU 11 returns to the main process, the CPU 11 directly returns to the process at step S101.

If the instruction from the player is not the move instruction, the CPU 11 determines whether or not the input instruction is an instruction to display the main menu (step S108). If the instruction is not the display instruction, the CPU 11 executes another process in accordance with the contents of the instruction (including the process for terminating the game when the final event of the game is cleared) (step S109). As the other processes do not directly relate to the invention, their detailed explanations will be omitted. The flow then returns to the process at step S101.

When the instruction is the display instruction for the main menu, the CPU 11 generates the main menu and displays it on the display device 15 (step S110). When the player character has no raw stone material, the player cannot select the material conversion on the main menu. That is, the material conversion cannot be carried out. When the player character has no material other than the equipped one, the player cannot select the equipment of a material on the main menu. That is, the player character cannot equip a material in place of the currently equipped one.

The CPU 11 determines whether or not the player has operated the input device 14 to select material conversion on the main menu, displayed on the display device 15 (step S111). When the material conversion is selected from the main menu by the player, the CPU 11 executes a material-conversion process for generating a material from the raw stone material (step S112). The material-conversion process will be explained in detail later. The CPU 11 then returns to the process at step S101.

If the material conversion is not selected on the main menu by the player, the CPU 11 determines whether or not the player has operated the input device 14 to select the equipping of a material (step S113). When the material equipping is selected by the player, the CPU 11 allows the player character to be equipped with the material selected by the player from the possessing materials. When the player character is already equipped with a material, the player character is allowed to be equipped with the material selected by the player, instead of the currently equipped material (step S114). The flow then returns to the process at step S101.

If the equipping of a material is not selected by the player on the main menu, the CPU 11 determines whether or not the player has operated the input device 14 to select the end of the game on the main menu, displayed on the display device 15 (step S115). When the end of the game is selected by the player, the CPU 11 saves data about the progress of the game at the present stage (for instance, the parameter of the player character) as the saved data in a predetermined area of the RAM 12 (step S116). Then, the process of the main routine illustrated by the flowchart is terminated. Next time the player starts the game, the CPU 11 loads the saved data saved in the RAM 12, so that the game can be resumed from the currently interrupted state.

If the end of the game is not selected by the player on the main menu, the CPU 11 determines whether or not the player has operated the input device 14 to select the closing of the menu (step S117). When the closing of the menu is selected by the player, the CPU 11 closes the main menu displayed on the display device 15 (step S118), and then returns to the process at step S101.

If the closing of the menu is not selected by the player on the main menu, the CPU 11 determines whether or not the player has operated the input device 14 to select another item (step S119). When another item is selected on the main menu by the player, the CPU 11 executes the other process according to the selected item (step S120). As the other processes do not directly relate to the invention, their detailed explanations will be omitted. The flow then returns to the process at step S101. When no item is selected on the main menu by the player, the flow also directly returns to the process at step S101.

Figure 4:
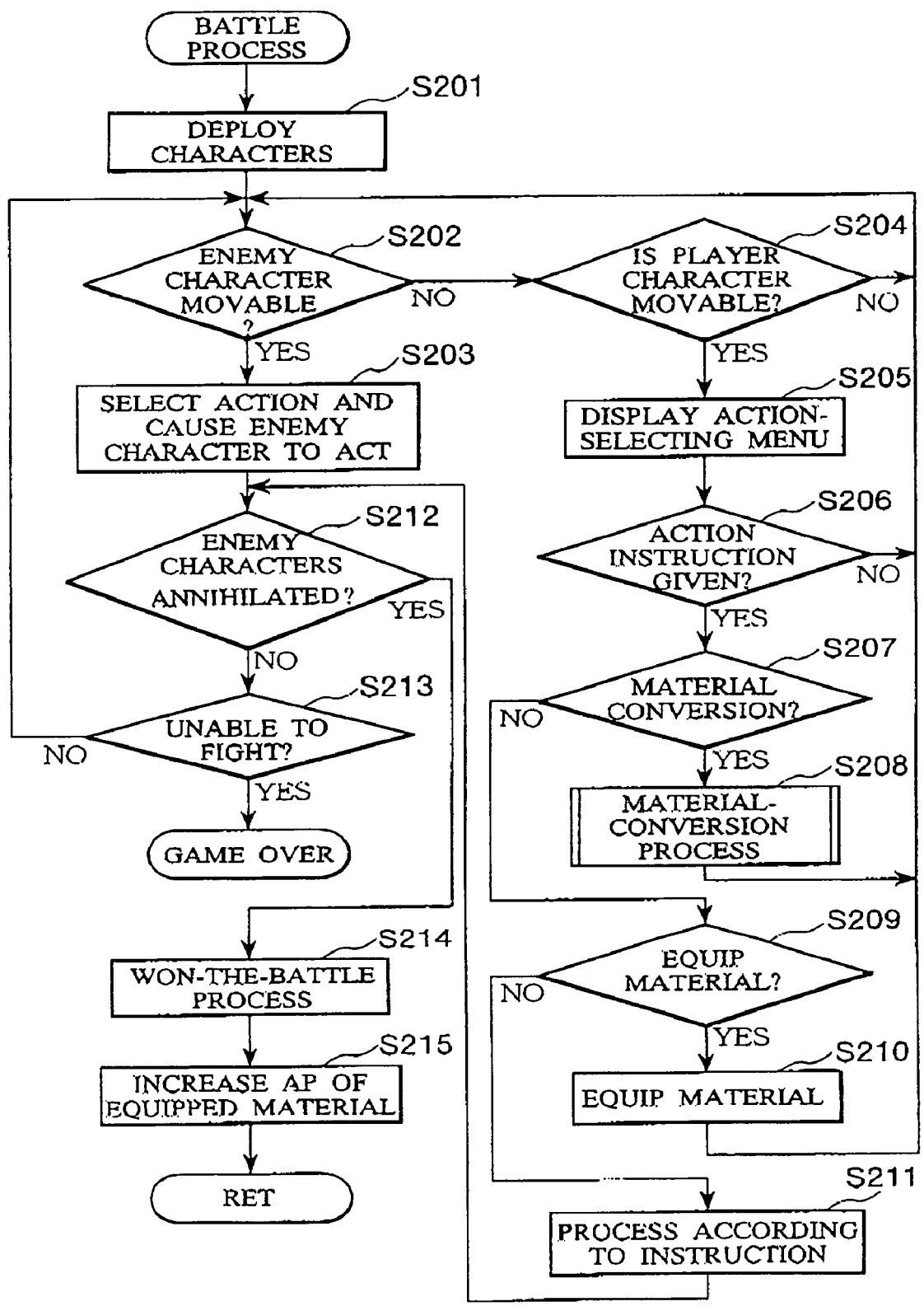
FIG. 4 is a flowchart illustrating the battle process of FIG. 3 according to an embodiment of the present invention.

FIG. 4 is a flowchart illustrating in more detail the battle process at step S107. In the battle process, the screen of the battle in action is kept displayed on the display device 15 until all of the enemy characters are annihilated after the initiation of the battle, or the player character is unable to fight. The description of the process relating to the display of the battle screen will be omitted.

The CPU 11 arranges the player character and enemy characters (e.g., one to three characters) in the battle on the map for the battle (step S201). The CPU 11 determines whether or not an enemy character participating in the battle is in active mode (step S202). In the battle screen, the player character and each enemy character can move at regular time intervals determined respectively. If an enemy character has been in active mode, the CPU 11 determines the action of the enemy character in accordance with the type of the enemy character, and causes the enemy character to take the decided action (step S203). The flow then proceeds to the process al step S212.

If any enemy character is not in active mode, the CPU 11 determines whether or not the player character is in active mode (step S204). If the player character is also not in active mode, the flow returns to the process at step S202, and the CPU 11 repeatedly makes the decisions on whether or not an enemy character is in active mode at step S202, and whether or not the player character is in active mode at step S204.

If the player character is in active mode, the CPU 11 displays an action selecting menu, for the player to select the action of the player character, on the forehead of the battle screen displayed on the display device 15 (step S205).

When the action selecting menu is displayed on the display device 15, the CPU 11 determines whether or not the player has operated the input device 14 to select any action on the action selecting menu (step S206). If no action is selected by the player, the flow returns to the process at step S202. If an enemy character becomes active before the selection of the player character's action, the CPU 11 allows the enemy character to act before the player character acts.

When an action is selected from the action selecting menu by the player, the CPU 11 determines whether or not the selected action is the material conversion (step S207). When the player character has no raw stone material, the player cannot select the material conversion on the action selecting menu, and the decision result always becomes NO here. When the material conversion is selected, the CPU 11 executes the material on version process (step S208), which will be explained in detail later, and returns to the process at step S202 after returning from the material-conversion process.

When the action selected by the player on the action selecting menu is not the material conversion, the CPU 11 determines whether or not the selected action is the equipping of a material (step S209). When the player character does not have any material except the one currently equipped on the player character, the player cannot select the equipping of the material on the action selecting menu, and the decision always results in NO.

When equipped material is selected by the player, the CPU 11 equips the player character with the material selected from the materials possessed by the player character. When the player character is already equipped with a material, the player character is then equipped with the selected material instead of the currently equipped one (step S210). The flow then returns to the process at step S202.

When the action selected by the player from the action selecting menu is neither the material conversion nor the material equipment, the CPU 11 executes a process according to the selected action (step S211). As this process does not directly relate to the present invention, its detailed explanation will be omitted. The flow goes to the process at step S212.

At step S212, the CPU 11 determines whether or not the player character has annihilated all the enemy characters as the result of the battle. When the player character has not annihilated the enemy characters yet, the CPU 11 determines whether or not the player character is able to fight (for example, the value of the HP of the player character becomes 0) as the result of the battle (step S213). When the player character is unable to fight, the flow returns to the process at step S202. When the player character is unable to fight, the game is over, and the process is terminated.

When the player character has annihilated all the enemy characters displayed on the display device 15 at step S212, the CPU 11 executes a won-the-battle process (for example, to increase the experience points in accordance with each defeated enemy character) (step S214). If the player character is equipped with any material, the CPU 11 increases the AP of that material stored in the material possession table. When the AP reaches a predetermined value due to the increment, the CPU 11 increases the material level of the material with which the player character is equipped (step S215). Then, the battle process is terminated after which the flow returns to the main routine in FIG. 3.

Figure 5:
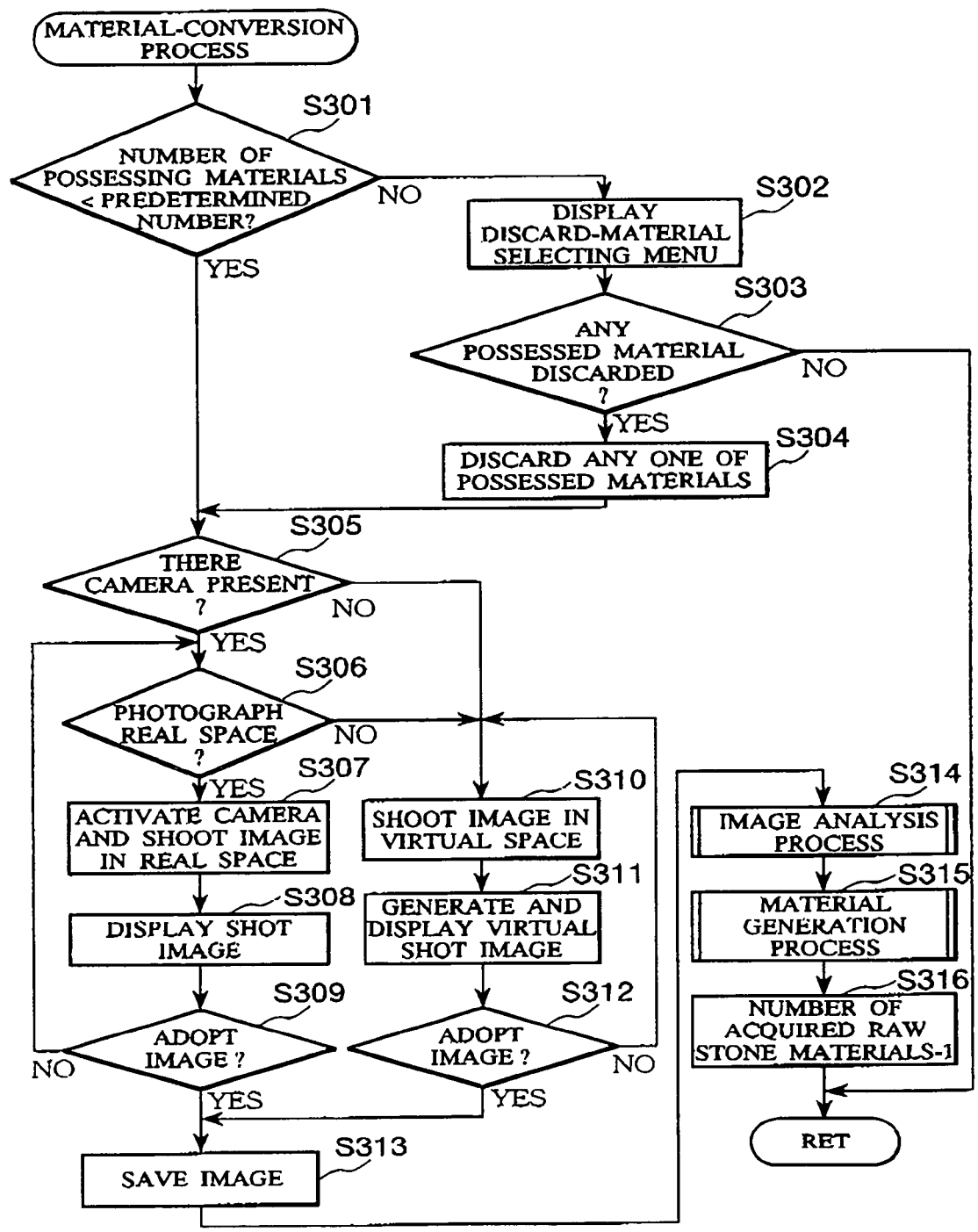
FIG. 5 is a flowchart illustrating the material conversion process of FIG. 3 or FIG. 4 according to an embodiment of the present invention.

FIG. 5 is a flowchart illustrating in more detail the material-conversion process at steps S112 and S208. At the material-conversion process, the CPU 11 determines whether or not the number of the material possessed by the player character, stored in the RAM 13, is less than the predetermined number (in this case, five) (step S301). When the number of possessed materials is less than the predetermined number, the flow directly proceeds to the process at step S305.

When the number of the possessed materials is greater than an equal to the predetermined number, the CPU 11 displays a discard-material selecting menu, which lists all of the materials possessed by the player characters on the foreground of the game screen (step S302). The player will select whether or not to discard the material and select any one of the materials displayed on the discard-material selecting menu. The CPU 11 determines whether or not the discard of any one of the possessed materials is selected on the discard-material selecting menu (step S303).

When the instruction from the player is not to discard one of the possessed materials, the CPU 11 does not execute the generation of a material, and terminates the material-conversion process right away. When one of the materials is selected on the discard-material selecting menu by the instruction from the player, the CPU 11 discards that material and erases data of that material from the RAM 13 (step S304). The flow then goes to the process at step S305.

At step S305, the CPU 11 determines whether or not the cellular phone includes the camera 16. If the cellular phone does not include the camera 16, the flow directly goes to the process at step S310. When the cellular phone comprises the camera 16, the CPU 11 determines whether or not the photographing of the real space with the camera 16 is selected from a camera selecting menu displayed on the foreground of the game screen in response to the instruction from the input device 14 (step S306). When the real space is not to be photographed, the flow goes to the process at step S310.

When the player selects the photographing of the real space with the camera 16, the CPU 11 activates the camera 16, and displays the image of the real space on the display device 15. The CPU 11 captures the image at an arbitrary timing when the player operates the input device 14 (step S307). The CPU 11 displays the photographed image on the display device 15 (step S308). The CPU 11 determines whether or not the displayed image, shot in response to the player's instruction, is selected as the image for the material conversion (step S309). When the player does not adopt the photographed image, the image is discarded, and the flow returns to the process at step S306. When the adoption of the photographed image is selected by the player's instruction, the flow proceeds to the process at step S313.

When it is determined that the cellular phone does not include the camera 16 at step S305, or it is selected that the real space is not to be photographed (that, is, the virtual 3D space is to be photographed) at step S306, the CPU 11 allows the player character to get a virtual cellular phone (including the virtual camera) to shoot the virtual 3D space with the virtual camera. In accordance with the player's operation of the input device 14, the CPU 11 moves the player character to shoot the image in the virtual 3D space at an arbitrary timing (step S310).

The shooting of the image of the virtual 3D space is carried out as the visual axis faces in the direction in which the virtual camera of the cellular phone retained by the player character is directed, with the position of the player character being the location of the viewpoint of the virtual camera. The virtual camera exists at or near the position of the player character. The CPU 11 sets the view angle at a predetermined given angle, and carries out the perspective transformation of the image of the virtual 3D space onto the virtual screen. The image perspectively transformed onto the virtual screen is to be the image of the virtual 3D space captured by the virtual camera.

The CPU 11 displays the image of the virtual 3D space which is shot by the virtual camera, located on the player character, on the display device 15 according to the operation of the player (step S311). The CPU 11 determines whether or not the use of the displayed image, shot in the virtual 3D space in response to the player's instruction, as the image for the material conversion, is selected (step S312). When the player does not adopt the captured image, the flow returns to the process at step S310. When the adoption of the captured image is selected in response to the player's instruction, the flow proceeds to the process at step S313.

At step S313, the CPU 11 saves the image used as the image for the material conversion by the player at step S309 or step S312 in a specific area of the RAM 13. The flow goes to the image-analysis process (step S314), and then to the material-generation process (step S315). The details of the image-analysis process and the material-generation process will be explained later. The CPU 11 decrements the number of the acquired raw stone materials, stored in the RAM 13, by 1 (step S316). The material-conversion process is then terminated.

Figure 6:
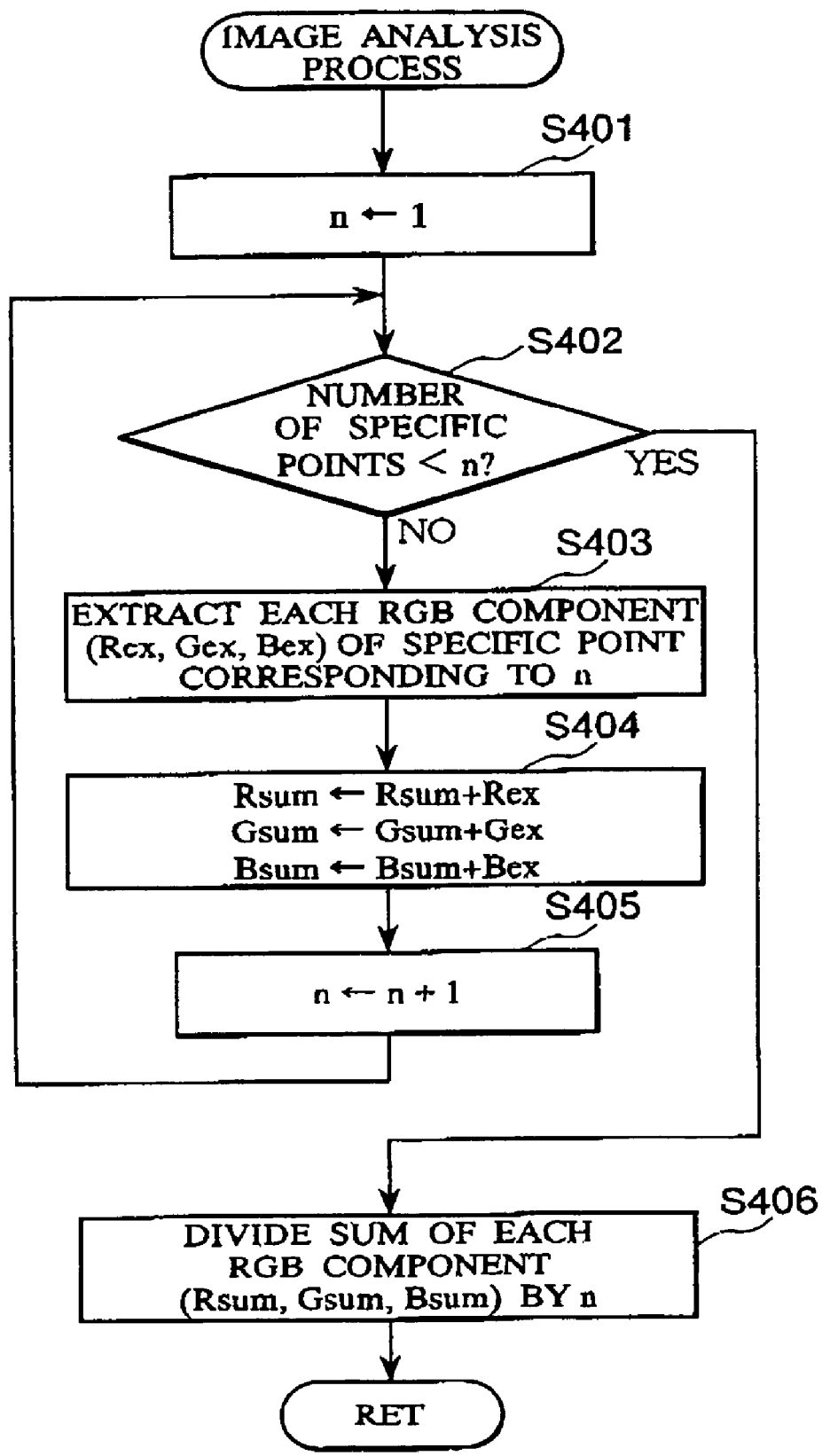
FIG. 6 is a flowchart illustrating the image analysis process of FIG. 5 according to an embodiment of the present invention.

FIG. 6 is a flowchart illustrating in more detail the image-analysis process at step S314. In the image-analysis process in the material conversion, the CPU 11 initializes the value of a parameter n, for defining one pixel point to be processed from the specific pixel points defined in the image data, to 1 (step S401).

The CPU 11 determines whether or not the value of the parameter n is larger than the number of the specific pixel points defined in the image data (step S402). If the value of the parameter n is less than the number of the specific pixel points, the CPU 11 extracts the RGB data of the pixel points corresponding to the parameter n in the image data (step S403).

The CPU 11 adds the sum of the data R and the extracted data R, the sum of the data G and the extracted data G. and the sum of the data B and the extracted data B, separately, and sets the addition results as new sums (step S404). The CPU 11 increments the value of the parameter n by 1 (step S405), and repeats the processes at steps S402 to S405 until the value of the parameter n becomes larger than the number of the specific pixel points. If it is determined that the value of the parameter n becomes larger than the number of the specific pixel points at step S402, the CPU 11 divides each sum by n, thereby calculating the average RGB (step S406). The image analysis process is then terminated after which the flow returns to the material-conversion process in FIG. 5.

Figure 7:
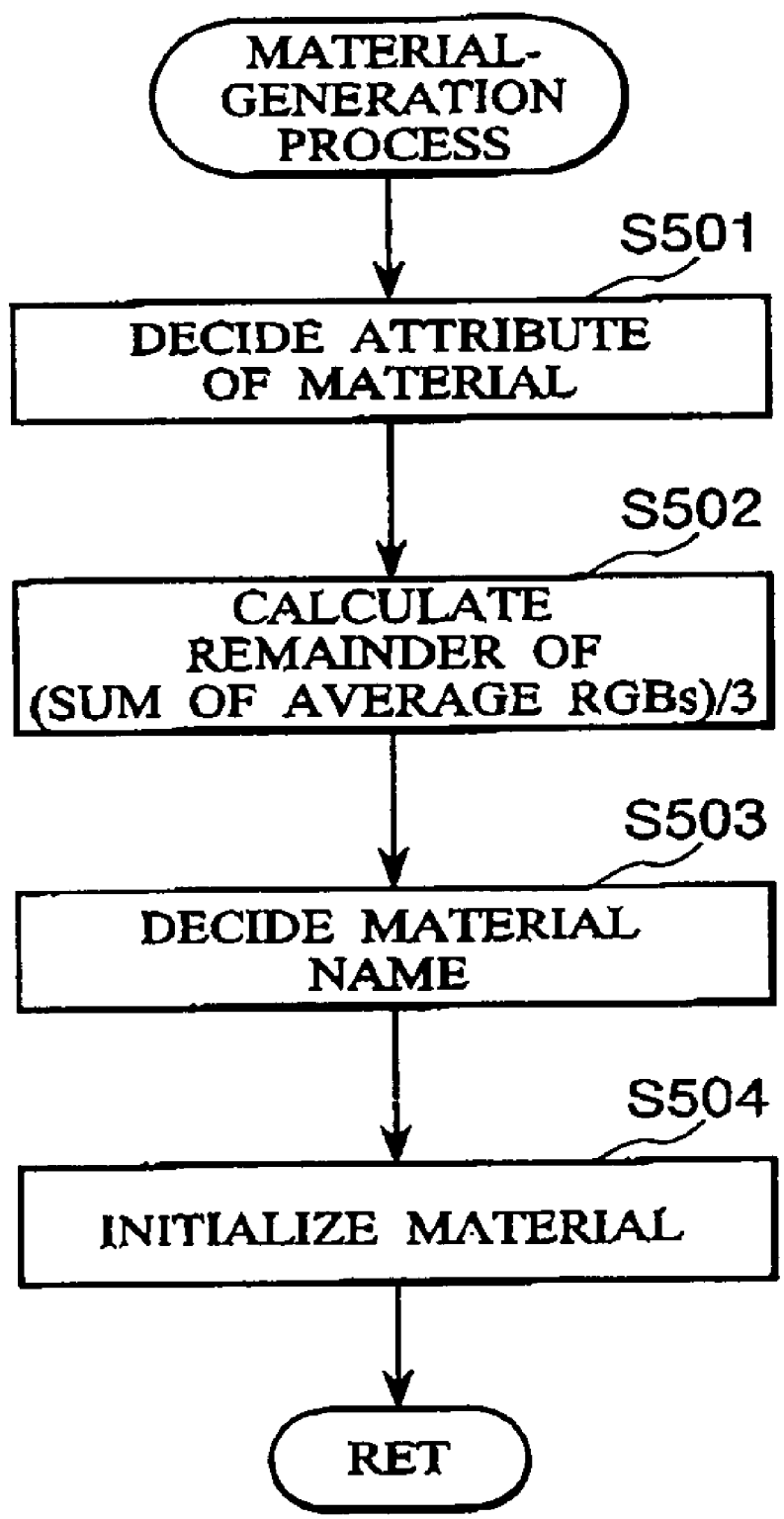
FIG. 7 is a flowchart illustrating the material generation process of FIG. 5 according to an embodiment of the present invention.

FIG. 7 is a flowchart illustrating in more detail the material-generation process at step S315. In the material-generation process in the material conversion, the CPU 11 refers to the material-attribute decision table stored in the ROM 12 in accordance with the average RGBs, defined by the image analysis process, and decides the attribute of the material (step S501). The CPU 11 adds each of the values of the average RGBs, and then divides the sum by 3 to calculate the RGB remainder (step S502). The CPU 11 refers to the material-name decision table stored in the ROM 12 in accordance with the RGB remainder and the attribute of the material, decided at step S501, and decides the material name (step S503).

The CPU 11 carries out material initialization (for instance, setting the value of the material level as the initial value of 0), and stores the generated material in the material possession table in the RAM 13 (step S504). The material-generation process is then terminated, and the flow returns to the material-conversion process in FIG. 5. The value of the AP and the material level is always zero at the time the material is generated, and can be increased by incrementing the AP to a predetermined value when the player character is equipped with the material.

The flow of material conversion in the game machine according to an embodiment will now be explained in detail below with reference to the examples of the display screen. FIGS. 8A to 8H, 8E', and 8F' are diagrams illustrating specific examples of a display screen 21 displayed on the display device 15 in the material conversion. An explanation is given of a case, as an example, where the player character carries out the material conversion when the player character can move in the virtual 3D space, not in the battle.

The display screen 21 includes a menu window 24, a message window 25, and an instruction selection window 26. The display screen 21 shows a player character 22, a flower 23, and a background behind those windows 24 to 26. All of the selectable instruction items are displayed in the menu window 24. A descriptive message is displayed in the message window 25 in accordance with the instruction item at which a cursor (shown in black in the diagram) is located. As the player moves the cursor to the desired instruction item and acknowledges it, that item is selected. Instructions, selectable by the player operating the input device 14, namely "Return", "Execute", "selection scroll", "Yes", and "No", are displayed in the instruction selection window 26 as needed. With the camera 16 or virtual camera activated, the display device 15 displays necessary instructions for shooting (shutter, zoom, etc.) in the instruction selection window 26.

Figure 8A:
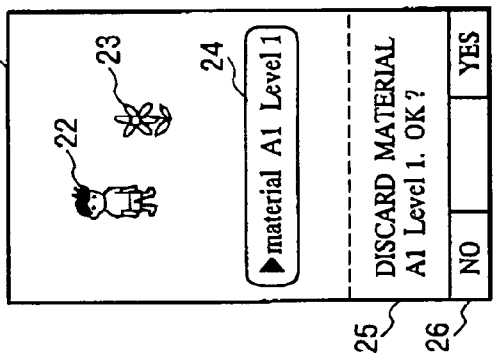
FIGS. 8A to 8H, 8E', and 8F' are diagrams illustrating examples of display screens at the time of material conversion.

In the menu window 24 (main menu) in FIG. 8A, when the player moves the cursor to the material conversion as the instruction item, the display device 15 displays a message relating to the material conversion in the message window 25. The material conversion is selected as the player acknowledges it. When the player character has no raw stone material, the player cannot select the material conversion. When the player character has no material except the equipped material, the player cannot select the equipping of the material. The menu window 24 also shows the player other items that can be selected.

Figure 8C:
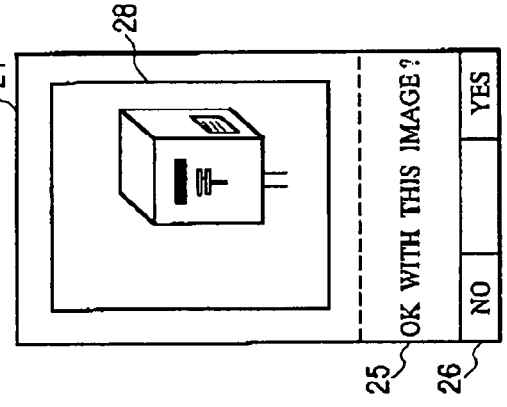
Figure 8B:
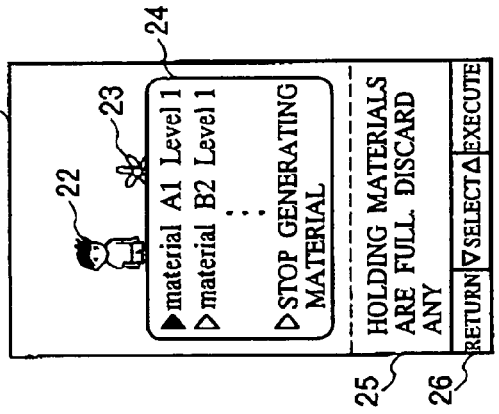

In a case where the player selects the material conversion, when the number of materials possessed by the player character becomes a predetermined number, the display screen 21 in FIG. 8B is displayed on the display device 15. The menu window 24 in FIG. 8B shows the discard-material selecting menu. The message window 25 in FIG. 8B shows a message for asking the player whether or not to discard any one of the possessed materials. Each possessed material displayed on the menu window 24 is associated with its material name and its material level.

When any one of the possessed materials to be discarded is selected by the player's instruction, the display screen 21 in FIG. 8C is displayed on the display device 15. The menu window 24 in FIG. 8C shows the discard material selected by the player in FIG. 8B. The message window 25 in FIG. 8C shows again a message asking the player to execute the discard. As the player acknowledges the execution of material discard from the input device 14, the material is discarded. The material may be discarded according to the discard-material selecting menu in FIG. 8B without displaying the confirmation window like the one in FIG. 8C.

Figure 8E:
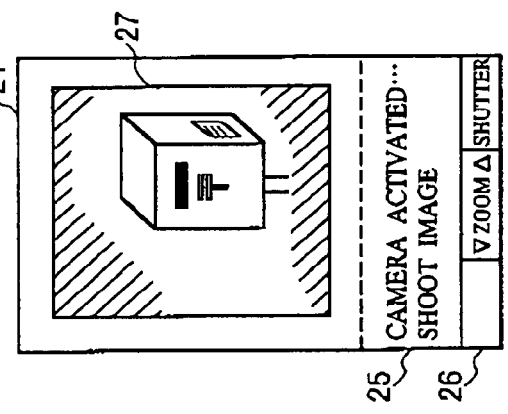
Figure 8D:
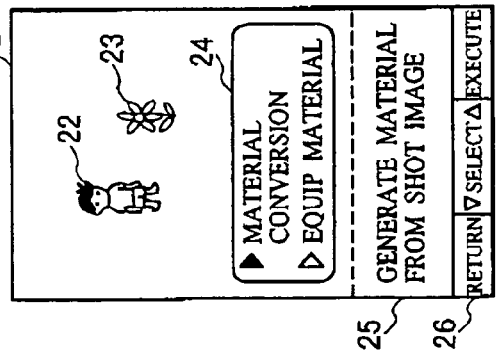

When the discard of the material has finished, the display screen 21 in FIG. 8D is displayed on the display device 15. The menu window 24 in FIG. 8D shows the camera selecting menu for photographing by the player. On the camera selecting menu, the camera shooting the real space and the virtual camera shooting the virtual 3D space arc displayed as camera selection items for the player to select. The message window 25 shows an instruction for the player to select the camera. When the cellular phone does not include the camera 16, the player cannot select the camera shooting item, but can select the virtual camera function item only.

When the player selects the camera which shoots the real space, the camera 16 of the cellular phone is activated by the CPU 11. As illustrated in FIG. 8E, the display device 15 displays the image 27 of the real space which is being captured by the camera 16. As the player operates the input device 14 at an arbitrary timing, the image 28 of the real space is shot as illustrated in FIG. 8F.

Figure 8F:
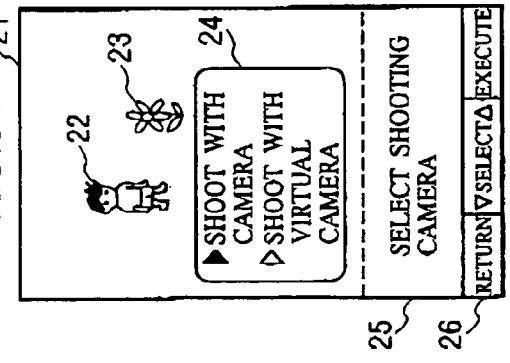
Figure 8E:
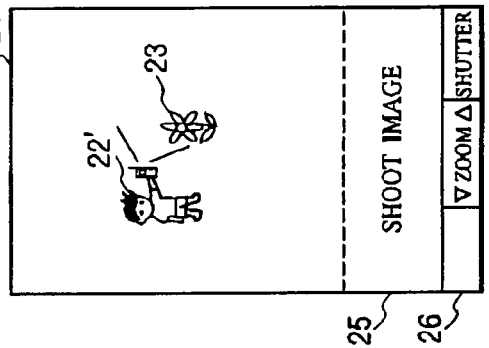
Figure 8H:
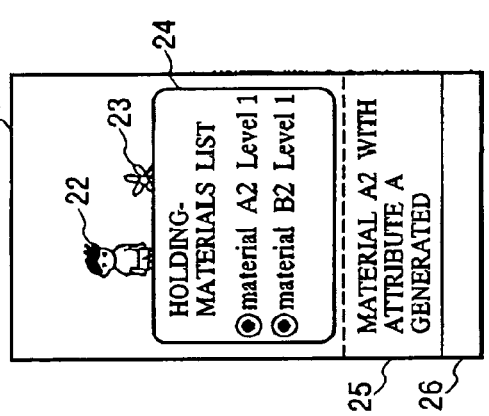
Figure 8G:
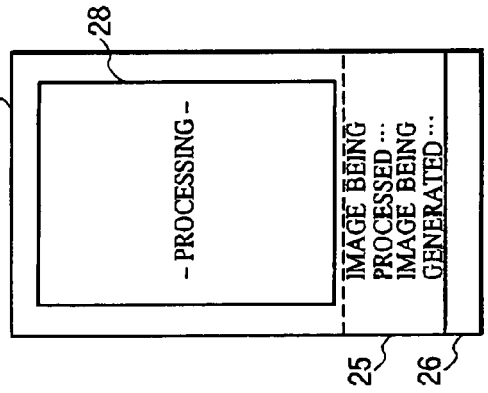
Figure 8F:
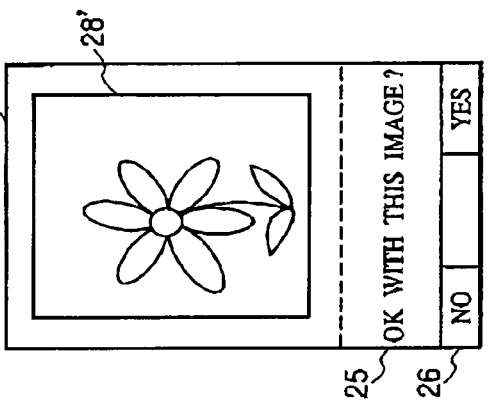

When the player instructs to use the image in FIG. 8F as the image for the material conversion, the CPU 11 decides the material status of the image in FIG. 8F, and generates the material. The display device 15 displays that the process is in progress as illustrated in FIG. 8G The generated material is, as illustrated in FIG. 8H, added to the material possession list of the player character, and is displayed on the menu window 24.

When the player selects the virtual camera in FIG. 8D, a scene 22' where the player character in the virtual 3D space holds the virtual camera (cellular phone) is displayed on the display device 21 as shown in FIG. 8E'. As the player operates the input device 14 at an arbitrary timing, the image of the virtual 3D space which is perspectively transformed onto the virtual screen from the viewpoint of the virtual camera is shot. When the player operates the input device 14, thereby shooting the flower 23 in the virtual 3D space, as illustrated in FIG. 8F', the virtual image 28' is displayed. The subsequent operations are the same as those following the process in FIG. 8G.

In the game machine according to the embodiments, as explained above, the material, which is used by the player character as the game progresses, is generated based on the image shot in response to the player's instruction. Accordingly, the progress of the game is changed not only by the selection of the timing for the usage of the material by the player, but also by the selection of the timing for the generation of the material by the player. This scheme increases a change in the contents of the game the player feels, thereby providing abundant variations to the contents of the game.

The timing at which an image is shot to generate a game element is determined according to a player's instruction, and also the generation of the game element causes the progress of the game to change. The generated game element can be used by a player character when further instructed by the player. This prevents the game from progressing against the player's intention as a result of the player's generating the game element.

Image shooting at the time of material conversion is selected by the player between shooting using the camera of the cellular phone in the real space or shooting using the virtual camera in the virtual 3D space. The selection of the image shooting scheme by the player makes the degree of freedom of the game larger, and provides the game with abundant variations of contents. When the player shoots the image with the virtual camera, the display device 15 displays a direction scene on which the player character in the virtual 3D space has the cellular phone and moves in the same way as the player in the real space. This makes the player identify with the player character and improves the realism.

The AP is set for each material as the individual experience points. When the player equips the player character with a material, the AP of the equipped material increases. The increment of the points of the AP increases the value of the material level, which defines the effects of magic provided by the material. In this manner, the player can obtain a change in the material not only when generating a new material, but also using the generated material. That is, as the player remains interested in equipping a material on the player character, the player can further enjoy the game.

At the time of generating a material, the attribute of the material is decided by the average RGB values, obtained by the CPU 11 by the extraction of the RGB data of the image data shot by the player. Moreover, in generating a material, the material name is decided by the RGB remainder, obtained by the CPU 11 by the extraction of the RGB data of the image data captured by the player. In this manner, as the CPU 11 analyzes the image data, captured by the player, with the RGB data, the analysis of the image data can be easily carried out.

The extraction of the RGB data in the generation of a material is carried out for specific pixels in the image data. As the CPU 11 takes the RGB data from the predetermined specific pixels as the analysis targets, the analysis can be carried out at a faster speed compared with a case of taking all pixels of the image data as the analysis targets.

Materials generated by material conversion are classified into different types of attributes in accordance with the result of analysis on the captured image data. Accordingly, the player easily recognizes differences in the roles of the generated materials based on the attributes of the materials. In addition, there are materials with the same attribute, but different effects. Therefore, the player can be interested not only in the attribute of the material, but also the magic effect of the material.

The image analysis process at the time of material conversion calculates the average RGB values from the RGB data of pixels of the captured image, and analyzes them. A material can be generated from the components which are close to the main colors of the image data. That is, the player can figure out, to a certain extent, a material to be generated has what kind of attribute when an image of which color is photographed. Of course, not all the pixels of the image data are used in calculating the average RGB values, but only specific pixels therein are used in calculating the average RGB values. Accordingly, merely glancing at the entire captured image, the player sometimes has a difficulty in imagining a material to be generated, thus increasing the degree of enjoyment at the time of generating the material.

The material has the parameter which defines the degree of advantage in the progress of the game. As the player equips the player character with a material, the parameter of that material is changed. As the parameter of the material equipped on the player is changed, the player's interest in the selection of a material from the possessed materials increases. The change in the parameter of the material increases the enjoyment of the game for the player.

For the player to generate a material, the player character should have a raw stone material. Accordingly, the material can be generated in limited cases, and the timing of the game when the player generates a material affects the progress of the game. That is, the generation of a material can provide the game with a greater variety of changes.

As the player moves the player character to a predetermined point on the map of the virtual 3D space, the player can get a raw stone material. As the player can get a chance of generating a new material in accordance with the progress of the game, the player can be kept interested in generating a new material. As a raw stone material is not stored in the material possession table as a possessed material, the number of the possessed materials is substantially larger than the limited number.

At the time that the player character acquires a raw stone material, it is not yet defined what material is generated from the raw stone material. The material generated from the raw stone material is defined in the process where the player carries out the material conversion at an arbitrary timing. Accordingly, compared with the case where the player character simply acquires a predefined material, the degree of freedom for the timing for acquiring the material can be increased, thus ensuring a greater variety of changes in the game.

The player can generate a new material by selecting material conversion as the action of the player not only while the player character is moving on the map in the virtual 3D space, but also while the battle, set as the event of the game, is taking place. The player can change the material to be equipped on the player character, including the newly generated material. The player can generate a material in accordance with the battle situation. Accordingly, the player can progress the game smoothly using the material. Different materials are likely to cause a difference between advantage and disadvantage particularly in a battle included in the events of the game. The effects of the generation of a new material and the equipping the materials during the battle become significant.

The present invention is not limited to the above-described embodiments, and can be modified and adapted in various other forms. Some modifications of the embodiments adaptable to the invention will now be explained below.

In the above-described embodiments, the player character can acquire a raw stone material only when moving to a predetermined point on the map in the virtual 3D space. However, the player character may purchase a raw stone material, like other items, at a store in the virtual 3D space, or acquire it by winning a battle against an enemy character. In this case, as the number of ways of acquiring a raw stone material increases, the opportunities for the material conversion increase. This increases the player's opportunities to generate a new material and the degree of freedom of the material-generating timing.

In the above-described embodiments, the player character can acquire a material only through material conversion. However, the player character may purchase a material, like other items, at a store in the virtual 3D space, and acquire it by winning a battle against an enemy character. In this case, the opportunities for acquiring a material increase, thereby increasing the degree of freedom of the material selection. The player character may sell a material generated from a raw stone material at the store in the virtual 3D space. The condition for selling the generated material by the player character may be set based on the parameter of the material.

In the above-described embodiments, the status of a material includes the material name, the attribute, the AP, the material level, and the equipment condition. However, a parameter, which affects the HP of the player character and the other statuses, may be set in the material status. As the AP of a material increases, a new material may be generated from the original material.

In the above-described embodiments, the number of materials that the player character can be equipped with is limited to one, selected by the player from materials possessed by the player character, but the player character may be equipped with multiple materials selected by the player from the materials possessed by the player character. In this case, the player character can use magic corresponding to each of the materials equipped. In some combinations of the materials equipped on the player character, a new effect (for instance, increasing or decreasing the ability of the player character) may be added.

The description of the above-described embodiments has been given of the usage of a cellular phone as a game machine. However, other hardware (for instance, a video game machine, a general personal computer, or a portable game machine) may be used as long as it has the same components as those of the cellular phone. Whichever type of hardware is used, the generation of a material based on an image of the real space requires that the hardware is equipped with a camera.

In the above-described embodiment, the game program executed by the game machine has been explained as an application program downloaded from the server device, and stored in the ROM 12. However, a cellular phone which has the game program prestored in the ROM 12 can be provided. For example, if a memory card which stores the game program therein is installed in the cellular phone, the game program stored in the memory card may be distributed in this form. The game program can be distributed by various other ways according to the hardware used as the platform.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A game machine for executing a game which allows a player character, which moves in a virtual space, to use a game element selected from a plurality of game elements of a plurality of types during a progress of the game, said game machine comprising:
   an imager that captures an image according to a first player instruction;
   an image storage that stores image data of the captured image;
   an image analyzer that analyzes the stored image data;
   a battle generator that generates a battle between the player character and an enemy character during the progress of the game;
   an action selector that selects, during the battle and in accordance with a second player instruction, one of a plurality of actions, the plurality of actions including a new game element generation action;
   a game element generator that generates a new game element of a type corresponding to a result of analysis of the image data when the action selector selects the new game element generation action, the new game element being capable of being used by the player character;
   a game element storage that stores the plurality of game elements including the new game element;
   a game element selector that selects one of the plurality of game elements, including the new game element, to be used by the player character from the plurality of game elements, including the new game element, stored in said game element storage; and
   a game element user that uses, by the player character, the selected one of the plurality of game elements during the progress of the game.

2. The game machine according to claim 1, wherein said imager captures an image of a real space with a camera equipped in said game machine in response to the first player instruction.

3. The game machine according to claim 1, wherein said imager captures an image of the virtual space with a virtual camera which is located at or near the player character in the virtual space in response to the first player instruction.

4. The game machine according to claim 3, wherein
   the virtual space is a three-dimensional space; and
   said imager carries out perspective transformation of the virtual space onto a virtual screen from a viewpoint of the virtual camera, and captures the image of the virtual space.

5. The game machine according to claim 1, wherein said image analyzer extracts data of a plurality of color components contained in the image data stored in said image storage, and analyzes the extracted data of the color components.

6. The game machine according to claim 1, wherein said image analyzer analyzes data of a predetermined specific pixel in the image data stored in said image storage.

7. The game machine according to claim 1, wherein said game element generator generates the new game element, which has at least one attribute of a plurality of types of attributes, each having a different role in the progress of the game, in accordance with the result of the analysis of the stored image data.

8. The game machine according to claim 1, wherein
said game element generator generates the new game element with a parameter defining a degree of advantage in the progress of the game;
said game element user allows the player character to equip the selected game element continuously; and
said game machine further comprises a parameter changer that changes the parameter of the game element with which the player character is equipped in accordance with the progress of the game.

9. The game machine according to claim 1, further comprising:
a raw material acquirer that acquires a raw material for generating the new game element in accordance with the progress of the game; and
a raw material storage that stores the acquired raw material, wherein:
said game element generator generates the new game element when at least one raw material is stored in said raw material storage; and
said game machine further comprises a raw material eraser that erases the raw material stored in said raw material storage upon generation of the new game element.

10. The game machine according to claim 1, wherein said action selector allows the player to select the action of the player character whenever a predetermined period of time passes in the battle.

11. The game machine according to claim 1, wherein:
said game element storage is able to store a predetermined number of the plurality of game elements; and
said game element generator generates the new game element when a number of the plurality of game elements stored in said game element storage is less than the predetermined number.

12. The game machine according to claim 11, further comprising:
a game-element-number decider that decides whether the number of the plurality of game elements stored in said game element storage is less than the predetermined number when a player instructs to capture the image with said imager; and
a game element eraser that erases one of the plurality of game elements stored in said game element storage when it is decided that the number of the plurality of game elements is at least equal to the predetermined number.

13. The game machine according to claim 1, further comprising:
an image displayer that displays the image captured with said imager; and
a game-element-generation selector that allows a player to select whether the new game element is to be generated based on the displayed image,
wherein said game element generator generates the new game element in accordance with the result of the image analyzer when generation of the new game element is selected by the player.

14. A game machine for executing a game which allows a player character, which moves in a virtual space, to use a game element selected from a plurality of game elements of a plurality of types during a progress of the game,
said game machine comprising a program memory which stores a program, a data memory which stores data, and a processor which executes the program,
wherein the program causes said processor to execute:
capturing an image according to a first player instruction;
storing image data of the captured image in said data memory;
analyzing the stored image data;
generating a battle between the player character and an enemy character during the progress of the game;
selecting, during the battle and in accordance with a second player instruction, one of a plurality of actions, the plurality of actions including a new game element generation action;
generating a new game element of a type corresponding to a result of the analyzing the stored image data when the new game element generation action is selected, the new game element capable of being used by the player character;
storing the plurality of game elements, including the new game element, in said data memory;
selecting, by the player character, one of the plurality of game elements, including the new game element, to be used by the player character from the plurality of game elements, including the new game element, stored in said data memory; and
using, by the player character, the selected one of the plurality of game elements during the progress of the game.

15. The game machine according to claim 14, wherein the image captured according to the first player instruction is an image of a real space captured with a camera of said game machine.

16. The game machine according to claim 14, wherein the image captured according to the first player instruction is an image of the virtual space captured with a virtual camera located at or near the player character in the virtual space.

17. A game progressing method for executing a game on a computer, the game allowing a player character, which moves in a virtual space, to use a game element selected from a plurality of game elements of a plurality of types during a progress of the game, said method comprising:
capturing an image according to a first player instruction;
storing image data of the captured image in a memory of said computer;
analyzing the stored image data;
generating a battle between the player character and an enemy character during the progress of the game;
selecting, during the battle and in accordance with a second player instruction, one of a plurality of actions, the plurality of actions including a new game element generation action;
generating a new game element of a type corresponding to a result of the analyzing the stored image data when the new game element generation action is selected, the player character being able to use the new game element;
storing the plurality of game elements, including the new game element, in said memory;
selecting, by the player character, one of the plurality of game elements, including the new game element, to be used by the player character from the plurality of game elements, including the new game element, stored in said memory; and
using, by the player character, the selected one of the plurality of game elements during the progress of the game.

18. The game processing method according to claim 17, wherein the image captured according to the first player instruction is an image of a real space captured with a camera of said computer.

19. The game processing method according to claim 17, wherein the image captured according to the first player instruction is an image of the virtual space captured with a virtual camera located at or near the player character in the virtual space.

20. A non-transitory computer-readable recording medium with a program recorded thereon for executing a game in a computer device, the game including a player character, which moves in a virtual space, using a game element selected from a plurality of game elements of a plurality of types during a progress of the game, wherein said program comprises:

an image capture code section that captures an image according to a first player instruction;

an image storage code section that stores image data of the captured image in a data memory of said computer device;

an analyzing code section that analyzes the stored image data;

a battle generation code section that generates a battle between the player character and an enemy character during the progress of the game;

an action selection code section that selects, during the battle and in accordance with a second player instruction, one of a plurality of actions, the plurality of actions including a new game element generation action;

a game element generation code section that generates a new game element of a type corresponding to a result of the analyzing code section when the action selection code section selects the new game element generation action, the player character being able to use the new game element;

a game element storage code section that stores the plurality of game elements, including the new game element, in said data memory;

a game element selecting code section that selects, by the player character, one of the plurality of game elements, including the new game element, to be used by the player character from the plurality of game elements, including the new game element, stored in said data memory; and a game element use code section that uses, by the player character, the selected one of the plurality of game elements during the progress of the game.

21. The recording medium according to claim 20, wherein the image captured according to the first player instruction is an image of a real space captured with a camera of said computer device.

22. The recording medium according to claim 20, wherein the image captured according to the first player instruction is an image of the virtual space captured with a virtual camera located at or near the player character in the virtual space.

23. The game machine according to claim 1, wherein:
the stored image data of the captured image comprises a plurality of pixels, each having an R value, a G value, and a B value; and
said image analyzer calculates an average R value, an average G value, and an average B value of the plurality of pixels to determine the type of the new game element.

24. The game machine according to claim 1, wherein:
the stored image data of the captured image comprises a plurality of pixels, each having an R value, a G value, and a B value; and
said image analyzer calculates a remainder of a sum of an average R value, an average G value, and an average B value of the plurality of pixels divided by a predetermined number to determine a name of the new game element.

25. The game machine according to claim 14, wherein:
the stored image data of the captured image comprises a plurality of pixels, each having an R value, a G value, and a B value; and
said processor analyzes the stored image data by calculating an average R value, an average G value, and an average B value of the plurality of pixels to determine the type of the new game element.

26. The game machine according to claim 14, wherein:
the stored image data of the captured image comprises a plurality of pixels, each having an R value, a G value, and a B value; and
said processor analyzes the stored image data by calculating a remainder of a sum of an average R value, an average G value, and an average B value of the plurality of pixels divided by a predetermined number to determine a name of the new game element.

27. The game processing method according to claim 17, wherein:
the stored image data of the captured image comprises a plurality of pixels, each having an R value, a G value, and a B value; and
said analyzing includes calculating an average R value, an average G value, and an average B value of the plurality of pixels to determine the type of the new game element.

28. The game processing method according to claim 17, wherein:
the stored image data of the captured image comprises a plurality of pixels, each having an R value, a G value, and a B value; and
said analyzing includes calculating a remainder of a sum of an average R value, an average G value, and an average B value of the plurality of pixels divided by a predetermined number to determine a name of the new game element.

29. The recording medium according to claim 20, wherein:
the stored image data of the captured image comprises a plurality of pixels, each having an R value, a G value, and a B value; and
said analyzing code section calculates an average R value, an average G value, and an average B value of the plurality of pixels to determine the type of the new game element.

30. The recording medium according to claim 20, wherein:
the stored image data of the captured image comprises a plurality of pixels, each having an R value, a G value, and a B value; and
said analyzing code section calculates a remainder of a sum of an average R value, an average G value, and an average B value of the plurality of pixels divided by a predetermined number to determine a name of the new game element.

* * * * *